United States Patent Office 3,390,727
Patented July 2, 1968

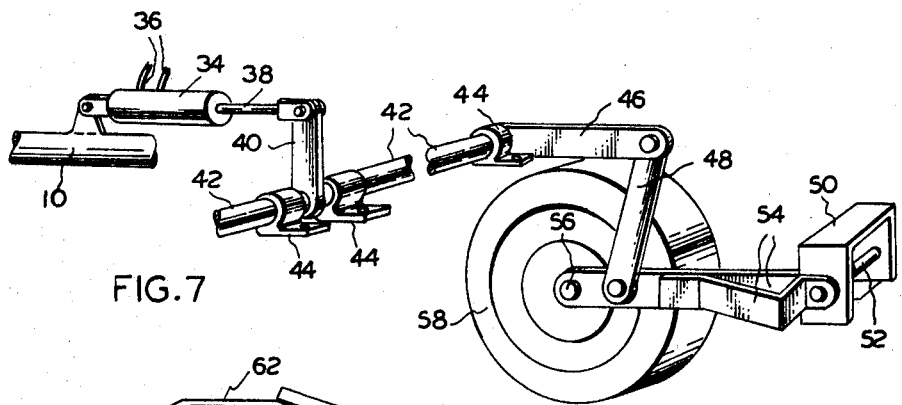
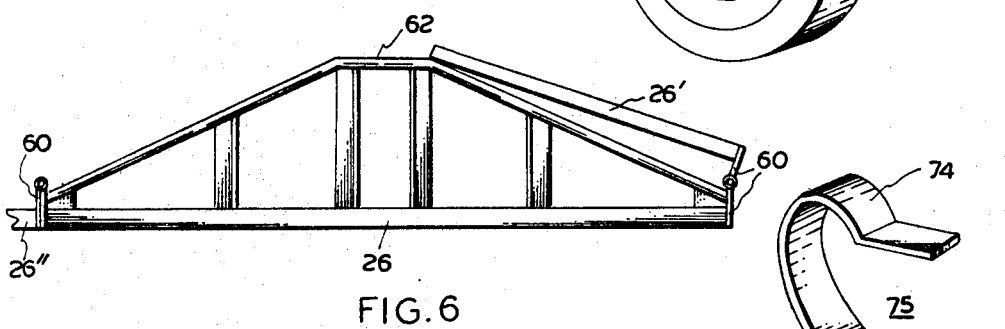
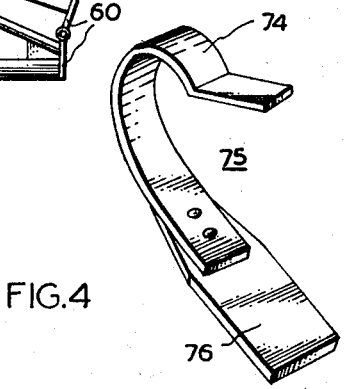
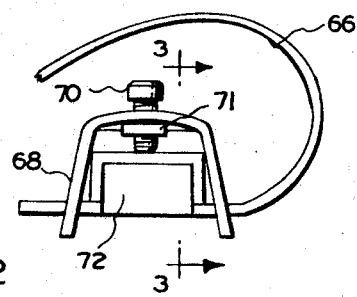
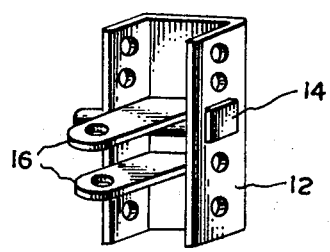
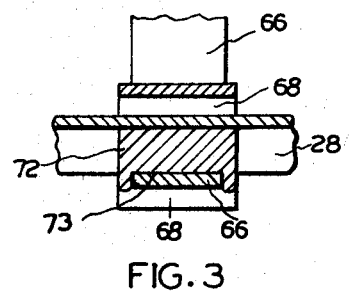

3,390,727
SPRING TOOTH HARROW
Harrison Weaver, Jr., 555 Lincoln Ave.; John W. Haun, 402 S. Main St.; and Thomas C. Hoyt, P.O. Box 37, all of Brillion, Wis. 54110; Clarence M. Hansen, 535 Bailey, East Lansing, Mich. 48823; and William H. Johnson, 935 Fenwick Place, Wooster, Ohio 44691
Continuation of application Ser. No. 373,912, June 10, 1964. This application Apr. 20, 1967, Ser. No. 632,447
1 Claim. (Cl. 172—413)

ABSTRACT OF THE DISCLOSURE

A foldable winged spring tooth harrow having depth limiting members on the wings and a wheeled central frame which has hydraulic means for moving the wheels vertically.

This is a continuation of application Ser. No. 373,912, filed June 10, 1964, now abandoned.

The present invention relates to farm implements and more particularly to a spring tooth harrow.

One object of the present invention is to provide an improved spring tooth harrow.

A further object of the present invention is to provide a spring tooth harrow having novel mounting means for locking the teeth to the frame of the harrow and which permit ready repositioning and removal of the teeth.

Another object of the present invention is to provide a spring tooth harrow with foldable side exensions that can be let down to increase the overall width of the harrow.

Still another object of the present invention is to provide a spring tooth harrow having novel depth control members.

Another and further object of the present invention is to provide a spring tooth harrow with a hydraulic lift mechanism for lowering and raising the support wheels of the harrow.

A still further object of the present invention is to provide a spring tooth harrow having an improved rigidly mounted draft member.

Another object of the present invention is to provide a spring tooth harrow with improved tooth mounting members and improved depth control members.

These and other objects of the present invention will be apparent from the following detailed description when read in conjunction with the drawings, wherein:

FIGURE 2 is a side view of a spring tooth mounting member,

FIGURE 3 is a cross-sectional view taken along line 3—3 of FIGURE 2,

FIGURE 4 is an isometric view of a depth control member,

FIGURE 5 is an isometric view of a hitch mechanism,

FIGURE 6 is a front view of a support structure and wing frame attachments,

FIGURE 7 is an isometric view of the hydraulic lift mechanism.

Figure 1:
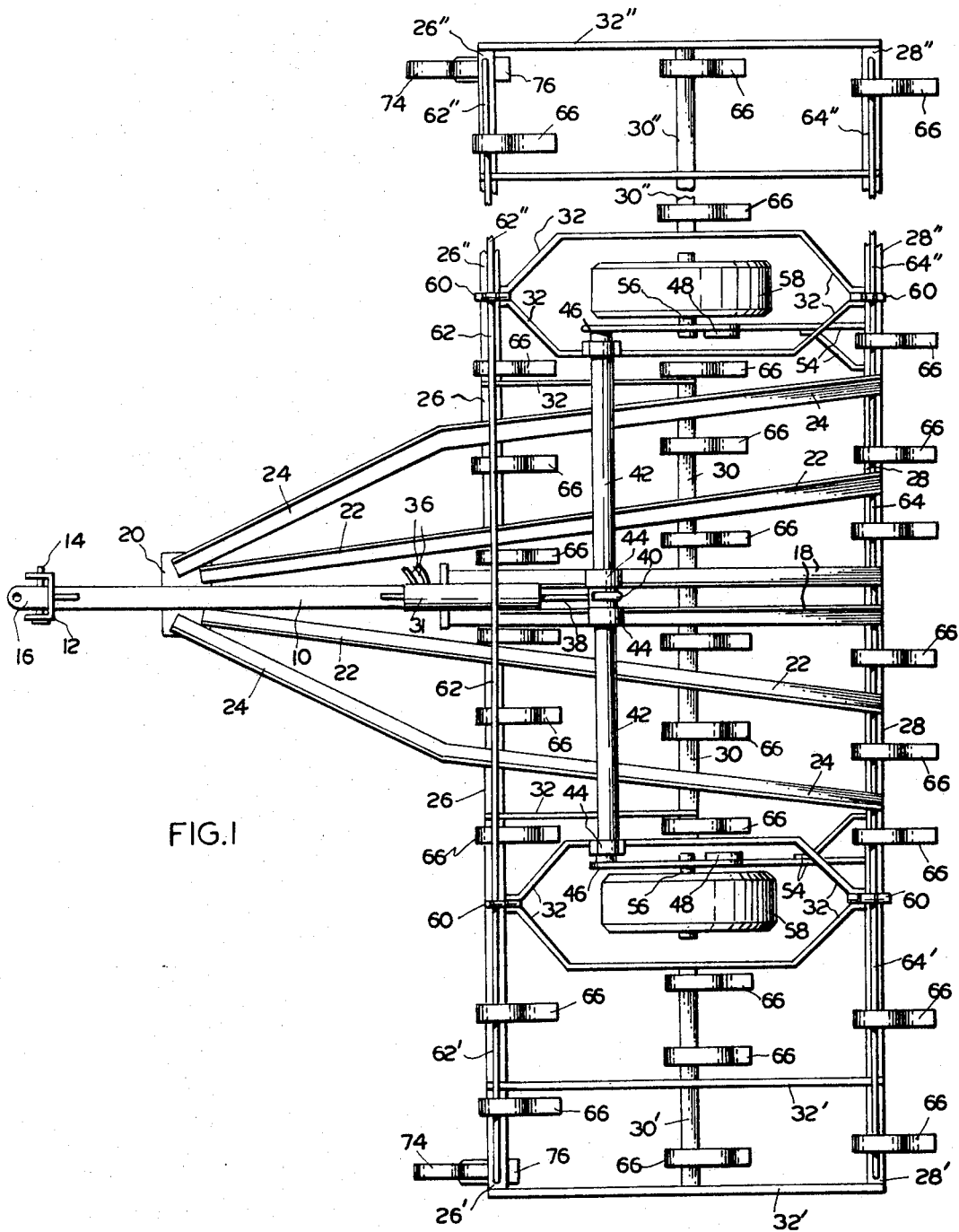
FIGURE 1 is a plan view of the top of the harrow.

In accordance with the drawings, a draft member for the harrow includes a cylindrical draw bar 10. Mounted on one end of draw bar 10 is vertically disposed channel bar 12. Channel 12 has a plurality of oppositely disposed holes drilled through the flanges thereof for the passage of an anchor bolt 14. Mounted within channel 12 and held in position by bolt 14 is clevis 16 having oppositely disposed holes drilled therethrough for attachment to the draw bar of a tractor or the like by means of an appropriate hitch bolt. Extending from and attached to the opposite end of draw bar 10 are angle bars 18 which form supports for the main frame structure of the harrow.

Attached to draw bar 10, intermediate its ends, is mounting plate means 20. Plate means 20 supports diverging L-shaped angle bars 22 and diverging angle bars 24. Angles 22 and 24 also form support elements for the main frame structure of the harrow.

Attached to angle bars 18, 22 and 24 and generally transverse to these bars and the direction of movement of the harrow are channel bars 26, 28 and 30. Channel 26 forms a front support for the main harrow frame, 28 the rear support and 30 the intermediate support. Flat brace elements 32 are mounted generally parallel to support elements 18, 22 and 24 and provide additional support for channels 26, 28 and 30.

Pivotally connected to draw bar 10 near its rear end is hydraulic cylinder 34 supplied with hydraulic fluid through hydraulic lines 36. Piston rod 38 of the hydraulic mechanism is pivotally attached to vertically disposed lever bar 40. Lever bar 40 is fixedly attached to line shaft 42. Line shaft 42 is supported on angles 18 and braces 32 by pillow blocks 44. Extending rearwardly from line shaft 42 and rigidly mounted on the ends thereof are pivot bars 46. Mounted on channel 28 near the ends thereof are pivot means made up of lug elements 50 and bolts 52 passing through suitable holes in the legs of lug elements 50. This pivot means can also be an appropriately mounted bearing element. Pivotally attached to lug elements 50 through bolts 52 are wheel support bars 54. Wheel support bars 54 have attached on their terminal ends appropriate axles 56 which support wheels 58. Pivotally attached to wheel supports 54 and pivotally attached to pivot bars 46 are upright link bars 48. Mounted on the ends of channels 26 and 28 are butt-type hinges 60. Attached to the free leaves of hinges 60 are channel bars 26', 26", 28', 28", 30' and 30", which are in alignment with and form extensions of the corresponding channels 26, 28 and 30 of the main frame. Flat bar brace elements 32' and 32" tie together and support channels 26', 28' and 30', 26", 28" and 30" and form the wing frame members of the harrow. Tubular support bars 62, 62', 62" and 64, 64', 64" are mounted above and generally parallel to channels, 26, 26', 26" and 28, 28', 28" and are attached thereto by appropriate vertical support elements and gussets. Support bar 62 is offset upwardly at its center to also serve as a support for the wing frames.

Spring teeth 66 are supported on channels 26, 28 and 30 through novel mounting members including U-shaped clamps 68. Appropriate opposing openings are formed in the legs of clamps 68 to receive the butt ends of spring teeth 66. Passing through the base of clamps 68 are bolts 70 which are adapted to press against the top of channels 26, 28 and 30 and pull tooth elements 66 toward channels 26, 28 and 30 in clamping relation thereto and are held in place by nut 71. Mounted within channels 26, 28 and 30 are filler blocks 72. Filler blocks 72 have formed therein broad hollows or grooves 73 which are the same width and depth as the butt ends of spring teeth 66 and are adapted to receive spring teeth 66.

Mounted on the terminal ends of channels 26' and 26" are resilient depth control members 75. Depth control members 75 are attached to channels 26' and 26" through mounting elements 68, bolts 70 and filler blocks 72 in the same manner as spring teeth 66 are mounted. Depth control members 75 are made up of resilient element 74 and replaceable wear component and ground engaging element 76. As shown depth controls 75 are of generally the same C-shaped configuration as spring teeth 66 but are mounted in the reverse direction with respect to the direction of movement of the harrow to thereby form skids for the side wings of the harrow. Further, depth controls 75 extend below the frames of the wing sections a distance less than spring teeth 66.

We claim:
1. A spring tooth harrow comprising;
 (a) a main frame member, incuding, front, rear and middle channel bars aligned parallel to one another, a plurality of flat bar brace elements having one edge fixedly attached to said channel bars transverse thereto;
 (b) a draft member, including, a pair of angle bars attached to said main frame perpendicular to said channel bars and at the center of said main frame, a cylindrical draw bar attached to the front ends of said angle bars, a vertically-disposed first channel bar attached to the free end of said draw bar having a plurality of aligned round holes formed in its opposing flanges, a second channel bar of a length to fit between and transverse to the flanges of said first channel and having aligned holes in its opposing flanges and adapted to receive a hitch bolt, an anchor bolt adapted to pass through said holes in said first channel and between the flanges of said second channel, plate means attached to said tubular draw bar near its center, a pair of angle bars having one end attached to said plate, then passing rearwardly at acute angles on either side of said draw bar and crossing and being attached to said channels of said main frame, and a second pair of angle bars having one end attached to said plate, then passing rearwardly at an acute angle on either side of said draw bar and at a larger angle than said first pair of angle bars, then bending inward to a smaller angle as they cross said main frame and being attached to said channels of said main frame;
 (c) a hydraulic lift mechanism, including, a pair of horizontal wheel support bars having one end pivotally attached to said rear channel of said main frame adjacent the ends of said channel and terminating at the other end in an axle, a wheel attached to each of said axles, a pair of upstanding link bars pivotally attached to said wheel supports near said axles, a pair of horizontal pivot bars having one end pivotally attached to the other end of said link bars, a cylindrical line shaft rotatably attached to said main frame, parallel to said channels of said main frame, through a plurality of pillow blocks, and fixedly attached at its ends to said pivot bars, an upstanding lever bar having one end rigidly attached to said line shaft near the center thereof, a piston rod pivotally connected to the other end of said lever bar, and a hydraulic cylinder pivotally attached to said draw bar near its rear end and adapted to receive a piston attached to said piston rod;
 (d) a pair of wing frame members attached to the ends of said main frame, including, butt hinges having one leaf attached to the ends of said front and rear channels of said main frame, front, rear and intermediate channel bars positioned to be in alignment with complementary channel bars of said main frame when said hinges are closed, said front and rear channel bars being attached to the other leaves of said butt hinges, a plurality of flat bar brace elements having one edge fixedly attached to said channel of said wing frames transverse thereto;
 (e) a plurality of spring tooth mounting means distributed along the length of said channel bars of said main and wing frames, including, an inverted U-shaped clamp having legs longer than the flanges of said channels and straddling said channel, said clamp having openings adapted to receive the butt end of a spring tooth formed in its opposing legs, a bolt passing through the base of said clamp and held in an extended position inside said clamp to press against said channel, a solid rectangular mounting block adapted to fit inside said channel and extend slightly below flanges of said channel and having a broad hollow formed in its bottom transverse to the channel of said channel bar and of sufficient depth and width to receive the butt end of a spring tooth, said mounting block being adapted to be clamped between the butt end of a spring tooth and said channels;
 (f) a plurality of C-shaped spring teeth having their butt ends passing through the opposing openings of said clamps and the hollow formed in said mounting blocks;
 (g) depth control members mounted in said mounting means adjacent the outside front corners of said wing frames, including a resilient C-shaped bar having its open side facing rearwardly with respect to the direction of movement of said harrow, a butt end clamped in said mounting means, and a broadened tip on the lower end of the C, said lower end of the C extending downwardly a distance less than the downward extension of said spring teeth; and
 (h) tubular support bars attached to and disposed above said front and rear channel bars of said main and wing frames, the support bar on said front channel of said main frame being bent upwardly at the center to serve as a support for said wing frames when said wing frames are folded up.

References Cited

UNITED STATES PATENTS

| | | | |
|---|---|---|---|
| 488,714 | 12/1892 | Markham | 172—707 |
| 514,836 | 2/1894 | Ovenshire | 172—707 X |
| 610,115 | 8/1898 | Whipple | 172—635 X |
| 897,645 | 9/1908 | McLean | 306—1.5 |
| 1,196,293 | 8/1916 | Ryan et al. | 172—388 |
| 2,286,619 | 6/1942 | Hokanson | 172—456 X |
| 2,588,918 | 3/1952 | Graham | 172—413 X |
| 2,637,564 | 3/1953 | Stratman | 172—413 X |
| 2,641,886 | 6/1953 | Graham | 172—311 |
| 2,679,793 | 6/1954 | Rolf et al. | 172—776 X |
| 2,712,718 | 7/1955 | Love | 172—456 X |
| 2,754,739 | 7/1956 | Estes | 172—708 X |
| 3,008,527 | 11/1961 | Stohlman | 172—776 X |
| 3,152,431 | 10/1964 | Ott et al. | 56—6 |
| 2,545,111 | 3/1951 | Schaubert | 172—485 X |

FOREIGN PATENTS

| | | |
|---|---|---|
| 165,740 | 10/1955 | Australia. |
| 56,811 | 10/1939 | Denmark. |
| 1,274,266 | 9/1961 | France. |
| 529,574 | 7/1931 | Germany. |
| 17,466 | 2/1903 | Sweden. |

ABRAHAM G. STONE, *Primary Examiner.*

J. R. OAKS, *Assistant Examiner.*